Jan. 24, 1967     T. E. NALBAND ETAL     3,300,286
COMPOSITE METALLIC ROLL OR OTHER MEMBER
AND METHOD OF MAKING SAME
Filed July 10, 1964
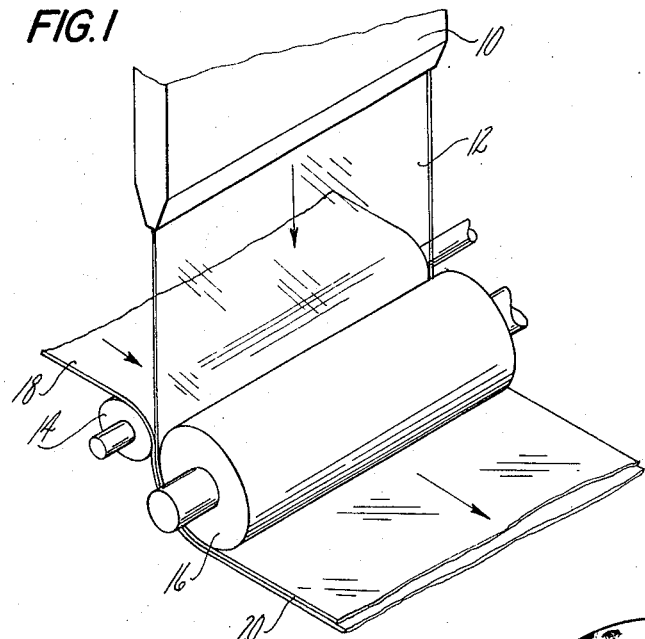
FIG. I
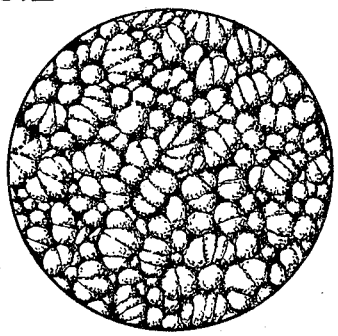
FIG. 2
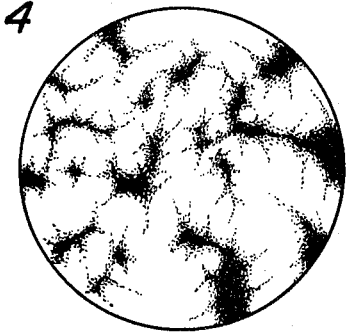
FIG. 3
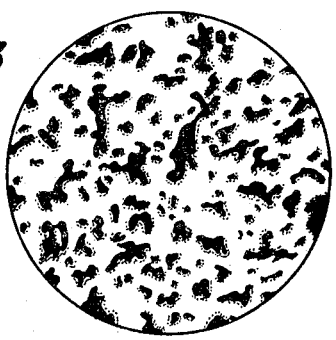
FIG. 4
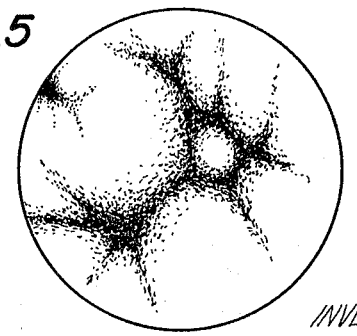
FIG. 5
INVENTORS.
THOMAS E. NALBAND
EUGENE R. NALBAND
RONALD T. DELANEY
BY McCormick, Paulding & Huber
ATTORNEYS United States Patent Office 3,300,286
Patented Jan. 24, 1967

3,300,286
COMPOSITE METALLIC ROLL OR OTHER MEMBER AND METHOD OF MAKING SAME
Thomas E. Nalband and Eugene R. Nalband, Cheshire, and Ronald T. Delaney, Watertown, Conn., assignors to The Mirror Polishing and Plating Company, Inc., Waterbury, Conn., a corporation of Connecticut
Filed July 10, 1964, Ser. No. 381,863
13 Claims. (Cl. 29—183.5)

This invention relates to a composite metallic roll or other member and a method of making the same and, more particularly, to a composite metallic roll having a chromium plate surface finish which includes a multitude of small plateaus and depressions in each square inch thereof.

It is the general object of the present invention to provide a surface finish and a method for accomplishing such a finish wherein the aforementioned plateaus and depressions are present in a specific relationship to afford improved results in use of the finish in the extrusion coating of plastic films and in other applications.

The drawing shows preferred embodiments of the composite roll and the methods of the invention are provided, and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:
FIG. 1 is a schematic view of a portion of apparatus employed in the extrusion coating of plastic films on substrate;
FIG. 2 is an ink reproduction of a photomicrograph of a partially complete surface finish under a magnification of 125×.
FIG. 3 is an ink reproduction of a photomicrograph of a complete surface finish under a magnification of 50×;
FIG. 4 is the FIG. 2 surface under a magnification of 125×; and
FIG. 5 is the FIGS. 3 and 4 surface under a magnification of 600×.

Referring particularly to FIG. 1, an extruder is shown schematically at 10 emitting a thin sheet or film of plastic 12 which moves downwardly and between left and right-hand rolls 14 and 16. The rolls 14 and 16 are commonly referred to as a "nip section" in the extrusion coating of plastic films of polyolefin, acrylic, etc. on papers, foils, etc. and the roll 14 is generally of rubber construction. The roll 16 is commonly referred to as a "chamber roll" and may be either heated or cooled but in the majority of cases it serves to cool the heated plastic film passing over its peripheral surface. The paper, foil or other substrate is indicated generally at 18 and is shown passing between the rolls 14 and 16 where the film 12 is overlaid on the substrate and joined thereto, the composite sheet being discharged at 20.

The foregoing description is quite brief but it serves to illustrate generally the function of a "chamber" or "chill" roll which may advantageously be constructed in accordance with the present invention. The present invention is, however, not limited to such a roll or the method used in making the same as will be clear hereinbelow.

The need for the present invention and the improved results achieved thereby are best illustrated with reference to rolls previously employed in place of the roll 16 mentioned above. Chromium plated rolls with a mirror finish have been used for this purpose and they have imparted an excellent appearance to the plastic sheet or film 12 on application of the same to the substrate. There are, however, several difficulties encountered with mirror finish rolls and the most serious of these resides in "blocking" or sticking of the film to the peripheral surface of the roll. Attempts to operate the machinery at relatively high speed have resulted in serious blocking or sticking problems and in breaking or tearing of the plastic film. This has imposed a severe limitation on the operating speed of the machinery employed in the extrusion coating process.

Secondly, rolls have been used in the position of the roll 16 with a "matte" finish. A "matte" finish is a relatively dull finish produced by sand or grit blasting a chromium plate and such a finish accommodates high speed machine operation. No serious problems of "blocking" or sticking of the film to the peripheral surface of the roll are encountered as a limiting factor and high production rates are achieved. The product is not, however, satisfactory in all respects. The finish imparted to the plastic film by the matte finish roll is likely to have low lustre characteristics and minute peaks in the matte finish may even penetrate the film rendering the finished product wholly unsatisfactory for certain applications.

The composite roll of the present invention may be described generally as having a chromium plate surface which is at least polished and which may be buffed to a mirror finish, and which has a multitude of minute depressions and plateaus formed therein in specific relationship. Such a surface imparts a desirably lustrous finish to plastic film and yet permits ready release of the film therefrom. As to appearance of the film, the lustre of the plastic is slightly less than that achieved with a mirror finish roll without depressions and this is believed advantageous. The mirror finish rolls used heretofore have been found to tend toward magnification of defects in the substrate due to their high lustre. The lustre achieved with the present finish is deemed a highly desirable compromise between that resulting from mirror finish and matte rolls. The absence of peaks in the finish, as encountered in a matte finish, wholly precludes the possibility of penetration and rupture of the film, the plateaus mentioned being substantially flat. Finally, the speed of operation of the machine is greatly enhanced due to the absence of "blocking" and sticking. It is found that the extrusion coating machine can be operated at several times the speed at which such machinery is operated when employing the prior mirror finish rolls mentioned above.

In practicing the method of the present invention, the base metal of the roll or other member is treated prior to chromium plating to provide a multitude of small depressions over each square inch of its peripheral surface. The depressions are substantially side-by-side with little or no flat plateau or land area therebetween and they may vary in depth between 0.0001 and 0.010 inch. Preferably, the surface of the base metal is sand or grit blasted approximately to saturation but without "overblasting" so that peaks between depressions remain sharp and distinguishable under microscopic examination.

In a specific example, a roll of steel base was grit blasted with aluminum oxide #36 grit under 65 to 70 pounds of air pressure with a direct pressure blasting machine. A ⅜ inch nozzle opening at a distance of approximately 4½ inches from the end of the nozzle to the roll surface was employed. The roll was revolved at 12 revolutions per minute with a surface speed of 37.6 feet per minute. The blasting nozzle was traversed across the face of the roll at approximately 4 inches per minute for a total of 2 passes. A circle of approximately ¾ inch in diameter formed the blast pattern and each point on the roll surface passed through the blast pattern approximately 4 times. This provided the aforementioned substantially complete blasting saturation without "overblasting" and the depressions were found to have sharp peaks therebetween. Average depression depth was approximately 0.0097 inch.

Optionally, the surface of the base metal may be polished lightly after blasting and prior to chromium plating. Polishing here may be accomplished by the conventional belt polishing methods or electropolishing in an electrolytic solution can be employed.

In the aforesaid specific example, the blasted base roll surface was polished lightly with a relatively fine abrasive between 180 and 240 grit belt. Sharp peaks were removed in this operation.

The next step in the method of the present invention comprises the chromium plating of the surface of the base metal of the roll or other member under treatment. Chromium plating is accomplished by electro-deposition in a conventional manner. The range of thickness of the plate must be controlled. If the plate is too thin, subsequent polishing may remove the plate altogether over plateaus or land areas whereas a plate that is excessively thick may provide an ultimate finish absent the desired minute plateaus and depressions. It is found that the chromium plate should fall in a range of thickness between 0.0005 and 0.010 inch and the optimum thickness of the electro-deposited chromium is believed to fall in the range of 0.0035 and 0.0040 inch.

The roll mentioned above was chromium plated in a conventional manner to a thickness between 0.0035 and 0.0040 inch. FIG. 2 shows the result of this plating under a magnification of 125× and it will be observed that the chrome plate is comparatively rough although absent sharp peaks.

The final step in the method of the present invention comprises at least the polishing of the chrome plated surface to provide the substantially flat plateaus, polishing being defined in the plating industry as involving the removal of metal; and in some cases the final step also involves the buffing of the surface, buffing being defined in the industry as "building brightness." It is essential in accordance with the present invention that the plateau or land areas between depressions be reduced to a substantially flat form as stated in the polishing of the surface.

With the roll mentioned above, polishing was accomplished after plating with a 120 grit wheel and this was followed by buffing to a mirror finish. Buffing was accomplished in four diverse directions to insure that no sharp corners or edges were present between the depressions and the land or plateau areas and to insure a mirror finish in the depressions themselves. In FIG. 3, the light area represents the land or plateau area and the dark area, the depressions. A similar condition holds true in FIGS. 4 and 5 under higher magnification. Particularly in FIGS. 4 and 5, attention is invited to the absence of sharp corners or edges between the depressions and land or plateau areas, the relatively rounded condition of these edges resulting from the multi-direction buffing. Tearing and/or piercing the film is thus avoided.

Now with regard to the ultimate finish, it is believed that the outer or broad range of depressions per square inch resides in the neighborhood of 2500 to 360,000 depressions per square inch. Further, under microscopic examination, the aforementioned roll was found to have between 10,000 and 14,000 depressions per square inch and this is believed to be the optimum range for ready release and desirable lustre and appearance of at least some of the plastic films employed in the extrusion coating of papers, foils, etc. Other plastics will undoubtedly require surfaces falling in the much broader range 2500 to 360,000 as set out above.

The depth of the depressions should be from 0.0003 to 0.0006 for optimum results with the roll mentioned. Success has been achieved, however, with pockets as deep as 0.0015 and as shallow as 0.0001 inch. The entrapment of air in the pockets is believed the primary reason for the excellent film releasing properties of the surface.

Finally, it is to be observed that the finish achieved with the method of the invention is subject to many additional uses as yet unknown. It should be understood that the invention is not limited to a composite metallic roll or to any other specific member comprising the chromium plate finish described above. Similarly, buffing is found unnecessary in certain applications as mentioned above.

The invention claimed is:

1. A composite metallic roll or other member comprising a body formed of a base metal receptive to chromium plate and having a surface which includes a multitude of small depressions per square inch which are between .0001 inch and .010 inch in average depth and which in number, size and depth are at least of the order of depressions which result from grit blasting such a surface with grit in the range 16 to 120, and a chromium plate between .0005 inch and .010 inch in thickness disposed over said body surface, said plate having a surface including a multitude of small substantially flat plateaus and depressions in each square inch thereof, and said last mentioned surface having at least a polished finish.

2. A composite metallic roll or other member as set forth in claim 1 wherein said chromium plate surface includes between 2500 and 360,000 depressions per square inch.

3. A composite metallic roll or other member as set forth in claim 1 wherein said chromium plate surface includes between 10,000 and 14,000 depressions per square inch.

4. A composite metallic roll or other member as set forth in claim 1 wherein the average depth of the depressions in the chromium plate surface falls between .0001 inch and .0015 inch.

5. A composite metallic roll or other member as set forth in claim 1 wherein the average depth of the depressions in the chromium plate surface falls between .0003 inch and .0006 inch.

6. A composite metallic roll or other member as set forth in claim 1 wherein the average depth of the depressions in the chromium plate surface falls between .0003 inch and .0006 inch, wherein the said surface includes between 10,000 and 14,000 depressions per square inch, and wherein the thickness of the chromium plate falls between .0035 inch and .0040 inch.

7. A composite metallic roll or other member as set forth in claim 6 wherein said chromium surface has a mirror finish substantially throughout the said plateaus and depressions.

8. A method of making a composite metallic roll or other member comprising the steps of providing a body of a base metal receptive to chromium plate and which includes a surface to be plated with a multitude of small depressions between .0001 and .010 inch deep per square inch, chrome plating said surface to a plate thickness between .0005 inch and .010 inch so as to provide a plate surface with a multitude of depressions per square inch, and polishing said plate surface to provide substantially flat plateaus between said depressions.

9. A method of making a composite metallic roll or other member comprising the steps of providing a body of a base metal receptive to chromium plate, grit blasting a surface to be plated on said base metal with grit between 16 and 120 in number so as to provide a multitude of small depressions between .0001 and .010 inch deep per square inch, chrome plating said surface to a plate thickness between .0005 inch and .010 inch so as to provide a plate surface with a multitude of depressions per square inch, and polishing said plate surface to provide substantially flat plateaus between said depressions.

10. A method of making a composite metallic roll or other member comprising the steps of providing a body of a base metal receptive to chromium plate, grit blasting a surface to be plated on said metal with grit in the range 16 to 120 to provide a multitude of small depressions between .0001 and .010 inch deep per square inch, chrome plating said surface to a plate thickness between .0035 and .0040 inch so as to provide a plate surface with a multitude of depressions per square inch, and polishing said plate surface to provide substantially flat plateaus between said depressions.

11. A method as set forth in claim 10 wherein said last mentioned step includes the polishing and buffing of said surface to a mirror finish substantially throughout the plateaus and depressions.

12. A method of making a composite metallic roll or other member comprising the steps of providing a body of a base metal receptive to chromium plate, grit blasting a surface to be plated on said metal grit in the range 16 to 120 to provide a multitude of small depressions between .0001 and .010 inch deep per square inch, polishing said grit blasted surface lightly with a relatively fine abrasive element, chrome plating said surface to a plate thickness between .0005 inch and .010 inch so as to provide a plate surface with a multitude of depressions per square inch, and polishing and buffing said plate surface to provide a mirror finish in the depressions and throughout the surface.

13. A method of making a composite metallic roll or other member comprising the steps of providing a body of a base metal receptive to chromium plate, grit blasting said surface to be plated with a grit in the range 16 to 120 substantial to complete blasting saturation whereby to provide multitudes of small peaks and depressions per square inch distinguishable under microscopic examination, polishing said grit blasted surface lightly with a relatively fine abrasive element, chrome plating said surface to a plate thickness between .0005 inch and .010 inch so as to provide a plate surface with a multitude of depressions per square inch, and polishing and buffing said plate surface to provide a mirror finish in the depressions and throughout the surface.

References Cited by the Examiner
UNITED STATES PATENTS

| | | | |
|---|---|---|---|
| 1,813,842 | 7/1931 | Fink | 204—36 |
| 2,412,698 | 12/1946 | Van Der Horst | 29—196.6 XR |
| 2,516,986 | 8/1950 | Heinse | 204—35 XR |
| 2,800,436 | 7/1957 | Stareck | 29—196.6 XR |
| 2,893,931 | 7/1959 | Boyett | 204—29 XR |

HYLAND BIZOT, *Primary Examiner.*